United States Patent [19]

Yamaguchi et al.

[11] 3,744,816
[45] July 10, 1973

[54] VEHICULAR SAFETY DEVICE

[75] Inventors: Michio Yamaguchi, Kanazawa-ku, Yokohama; Yasuchiro Saito, Meguro-ku, Tokyo; Tsugio Noda, Kawagoe; Shinzo Tsuji, Kawagoe; Takashi Mitani, Kawagoe, all of Japan

[73] Assignee: Nissan Motor Company, Limited, Yokohama City, Japan

[22] Filed: Apr. 23, 1971

[21] Appl. No.: 136,858

[52] U.S. Cl. ............. 280/150 AB, 9/11 A, 137/68, 169/28, 222/5, 141/19
[51] Int. Cl. ........................................... B60r 21/08
[58] Field of Search ............... 280/150 AB; 9/11 A; 137/67, 68, 69, 70; 222/5; 169/28; 141/19

[56] References Cited
UNITED STATES PATENTS

| | | | |
|---|---|---|---|
| 3,172,684 | 3/1965 | Isaac | 280/150 AB |
| 2,972,998 | 2/1961 | Detwiler | 137/68 |
| 2,877,780 | 3/1959 | Whitley et al. | 137/68 |
| 3,118,460 | 1/1964 | Raess et al. | 137/68 |
| 3,209,937 | 10/1965 | Hirst et al. | 137/69 X |
| 3,511,183 | 5/1970 | Geffner | 137/68 X |
| 2,780,389 | 2/1957 | Sandgren | 137/68 |

*Primary Examiner*—Leo Friaglia
*Assistant Examiner*—John P. Silverstrim
*Attorney*—McCarthy, DePaoli & O'Brien

[57] ABSTRACT

An improved vehicle safety device is disclosed which is adapted to protect a vehicle occupant or a pedestrian from injury in the event of a collision of a motor vehicle. The safety device includes an inflatable confinement or a protector bag which is arranged to be rapidly expanded to a protective position immediately when the motor vehicle encounters the collision. The inflatable confinement is expanded with a pressurized gas which is supplied from a pressurized gas generator which is normally closed by a rupturable sealing member. The sealing member is ruptured to open the gas generator by means of a mechanism including an explosive means and a rupturing means which is moved by activation of the explosive means to a position in which the sealing member is ruptured.

1 Claim, 3 Drawing Figures

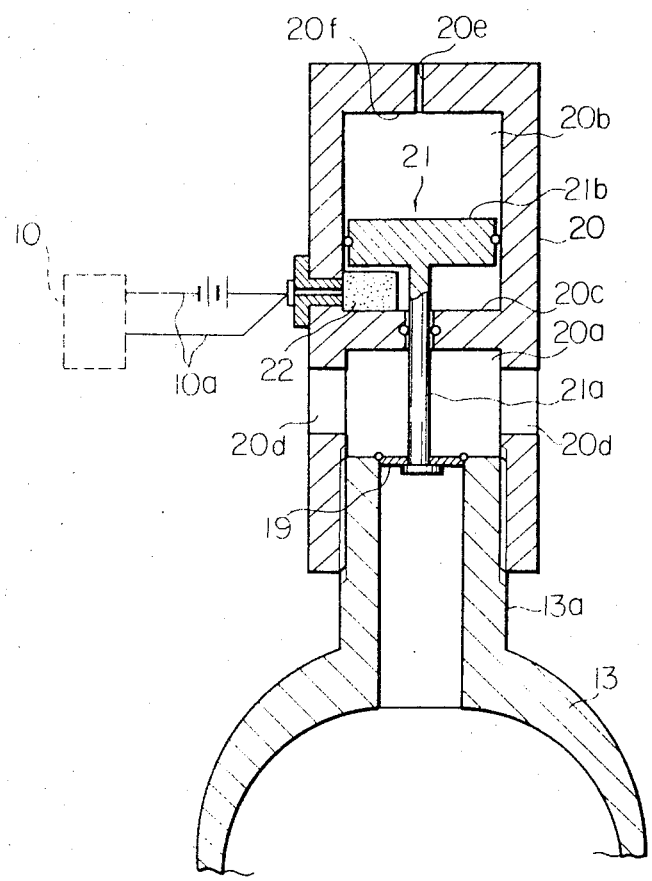

VEHICULAR SAFETY DEVICE

This invention is concerned with vehicle safety devices, and more particularly with a vehicle safety device of the type using an inflatable confinement or a protector bag which is adapted to be expanded to a position in which a vehicle occupant or a pedestrian is protected from injury during a collision of a motor vehicle.

The inflatable confinement in the expanded protective position is located intermediate between the vehicle occupant and structural parts such as a windshield, an instrument panel, a steering wheel and a seat back of the motor vehicle or between the pedestrian and external structural members of the motor vehicle whereby shocks and impacts resulting from the collision are absorbed.

In order that the vehicle safety device of the described nature operates reliably, it is of crucial importance that the inflatable confinement be expanded and projected to its protective position as fast as possible when the motor vehicle encounters the collision. Improvements have therefore been made on the safety device so that the collision condition is detected instantaneously and that the inflatable confinement assume the protective position as rapidly as possible.

The inflatable confinement, which is normally held in a collapsed stowed position, is expanded with a pressurized gas which is supplied from an appropriate pressurized gas supply unit. This unit includes a normally closed pressurized gas generator adapted to produce the pressurized gas when opened and a suitable sealing means normally closing the pressurized gas generator. The sealing means is associated with an impact-responsive triggering means which is actuated in response to an impact caused by the collision of the motor vehicle. The sealing means is released from the pressurized gas generator when this triggering means is actuated. Thus admitting the pressurized gas into the inflatable confinement which is in the collapsed position. This invention is directed generally to the thus arranged pressurized gas supply unit and more specifically to the sealing means of this particular unit forming part of the vehicle safety device.

An object of this invention is, therefore, to provide a vehicle safety device having an improved pressurized gas supply unit by which the pressurized gas is supplied to the inflatable confinement immediately when the triggering means is actuated in response to the collision condition of the motor vehicle.

Another object of this invention is to provide a vehicle safety device having an improved pressurized gas supply unit which is simple in construction and which offers ease of assembling during production.

This invention thus generally contemplates provision of a vehicle safety device which operates reliably and which can be manufactured economically.

These and other objects and features of this invention are attained basically in a vehicle safety device comprising an inflatable confinement or a protector bag of the above described character, a pressurized gas generator having a pressurized gas discharge spout, a rupturable sealing member closing the sealing member, a housing secured to the pressurized gas generator for enclosing a leading end portion of the discharge spout of the pressurized gas generator and the sealing member, this housing having a bore substantially aligned with the discharge spout of the gas generator and an opening communicating with the inflatable confinement, rupturing means which is movably mounted in the bore in the housing and which is associated with the sealing member, explosive means positioned close to the rupturing means, an impact-responsive triggering means connected to the explosive means and actuated in response to an impact resulting from the collision of the motor vehicle. The explosive means is activated when the triggering means is actuated so that the rupturing means is forced to move to a position in which the sealing member is ruptured thereby. The pressurized gas generator is thus opened and the pressurized gas is admitted to the inflatable confinement through the bore and the opening formed in the housing with the result that the inflatable confinement which has been in the collapsed stowed position is inflated and projected to the expanded protective position during the collision.

Drawings illustrate preferred embodiments of this invention, in which:

FIG. 3 is a view similar to FIG. 2 but shows a modification of the pressurized gas supply unit of FIG. 2.

Figure 1:
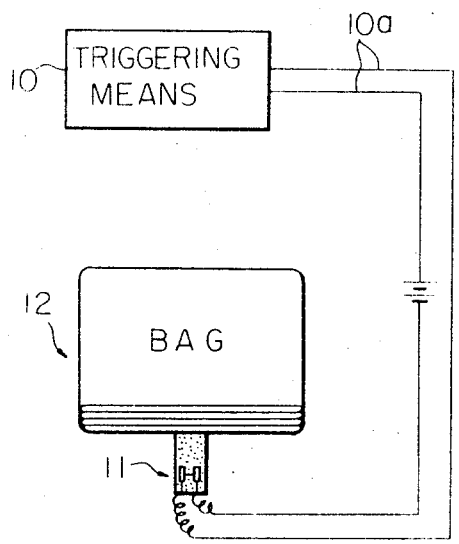
FIG. 1 is a schematic view showing a general construction of the vehicle safety device which is dealt with by the invention.
Figure 2:
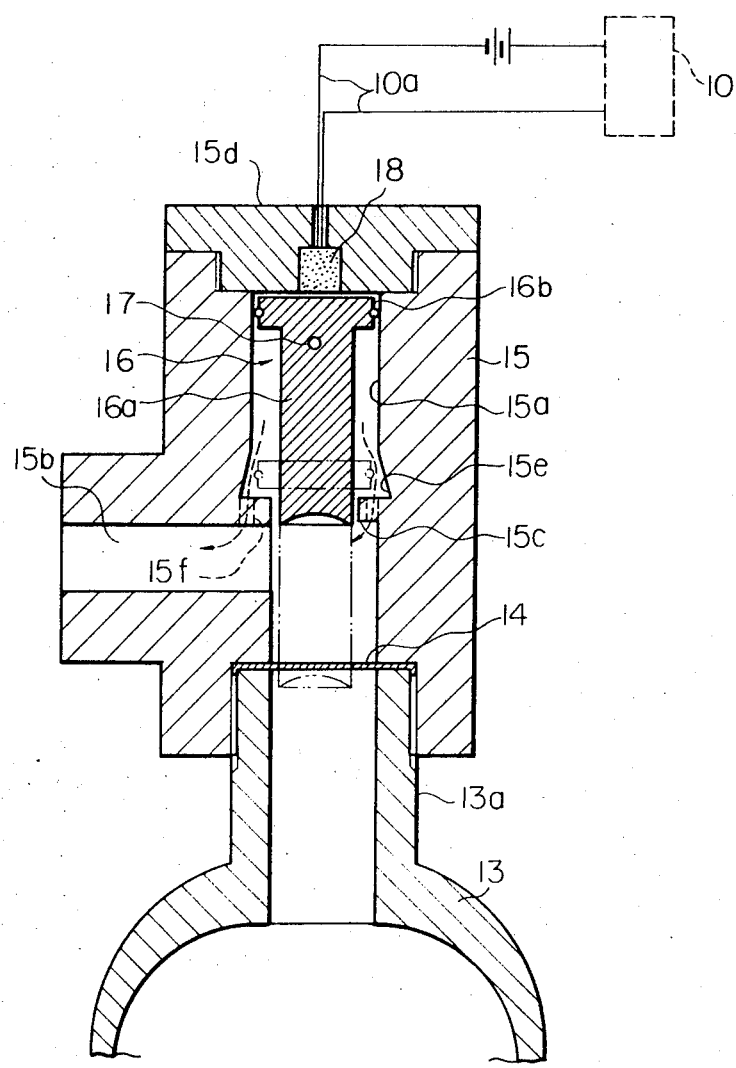
FIG. 2 is a sectional view of a pressurized gas supply unit of the safety device according to this invention.

Reference is first made to FIG. 1 illustrating in a diagrammatic form a general construction of the safety device in which the pressurized gas supply unit shown in FIG. 2 or 3 is to be incorporated. The safety device as shown largely consists of an impact-responsive triggering means 10 which is adapted to be actuated in response to an impact resulting from a collision of a motor vehicle. Since the manner in which the triggering means 10 responds to such impact and is thereby actuated may be as desired, no specific description thereof will be herein incorporated for simplicity of discussion. The triggering means 10 is associated with or connected to a pressurized gas supply unit 11 which is adapted to supply a pressurized gas when the triggering means 10 is actuated. This pressurized gas supply unit 11 includes a pressurized gas generator which may be constructed in any desired manner. The pressurized gas generator, for instance, may contain a gas under pressure or a liquefied gas which is ready for conversion into a gas under pressure. Or otherwise, the pressurized gas generator may have stored therein an explosive which is adapted to produce a gas under pressure when activated or blown up by suitable firing means. The pressurized gas supply unit 11 is connected to an inflatable confinement or a protector bag 12 which may be secured to any part or parts of the motor vehicle. This inflatable confinement 12 is normally stowed in a collapsed or folded position and, when expanded with the pressurized gas supplied from the pressurized gas supply unit 11, projected to a position intervening between the vehicle occupant and the structural parts of the vehicle cabin or between the pedestrian and the external structural members of the motor vehicle, as previously noted.

Of the units illustrated in FIG. 1, the pressurized gas supply unit 11 in particular is improved by this invention with a view to rapidly passing the pressurized gas to the collapsed inflatable confinement 12 as soon as the triggering means 10 is actuated. A preferred form of the pressurized gas supply unit constructed to this end is illustrated in FIG. 2.

Referring to FIG. 2, the pressurized gas supply unit includes a pressurized gas generator 13 which is adapted to supply a gas under pressure when opened. This gas generator 13 is provided with a pressurized gas discharge spout 13a which is normally closed by a rupturable sealing member 14 attached to an end of the discharge spout 13a. A housing 15 is secured to the pressurized gas generator 13 so that the spout discharge 13a and the sealing member 14 attached thereto are enclosed thereby. The housing 15 has formed therein a bore 15a which is substantially aligned with the leading end of the discharge spout 13a and an opening 15b through which the bore 15a communicates with the inflatable confinement 12 (FIG. 1). A rupturing means 16 including a plunger portion 16a directed toward the sealing member 14 is longitudinally movably mounted in the bore 15a of the housing 15, as illustrated. In the specific arrangement of FIG. 2, this plunger portion 16a is detachably connected to the housing 15 by means of a shear pin 17 which is rupturable when subjected to a predetermined stress. The movement of the rupturing means 16 into the discharge spout 13a is limited through engagement between an enlarged outer end portion 16b forming part of the rupturing means and an annular extension 15c formed in the bore of the housing 15 as indicated by phantom lines. Suitable explosive means 18 which may be in the form of a squib is embedded in an end wall 15d of the housing 15, located close to an outer face of the enlarged end portion 16b of the rupturing means 16 which is in the inoperative position. This explosive means 18 is associated with or connected to the impact-responsive triggering means 10 through lines 10a passing through the end wall 15d of the housing 15.

When, with this arrangement, the motor vehicle encounters a collision while it is travelling, the impact-responsive triggering means 10 responds to the collision condition and is thereby actuated to activate the explosive means 18. This causes the rupturing means 16 to be forcefully projected toward the sealing member 14 with the shear pin 17 cut off, hammering and breaking through the rupturable sealing member 14 by its plunger portion 16a. The pressurized gas generator 13 is in this manner opened instantaneously and the pressurized gas gushes into the bore 15a of the housing 15. The sealing member 14 which is now rupturing and the rupturing means 16 are violently blown off toward the end wall 15d of the housing 15, thereby providing a unobstructed communication between the pressurized gas generator 13 and the inflatable confinement 12 (FIG. 1) through the discharge spout 13a and the bore 15a and opening 15b of the housing. The inflatable confinement 12 which has thus far been in the collapsed position is expanded and projected instantaneously to the protective position, isolating the vehicle occupant or the pedestrian from the structural parts of the motor vehicle.

When the rupturing means 16 is forced toward away from the discharge spout 13a by the pressurized gas, air intervening between the end portion 16a and the end wall 15d of the housing 15 will be compressed so as to provide a resistance to the returning movement of the plunger 16. To avoid this difficulty, there may be formed in the bore 15a an annularly enlarged portion 15e which terminate at an outer end of the annular extension 15c and a passage 15f providing air communication across the annular extension 15c. The compressed air staying between the end wall 15d of the housing and the end portion 16a of the plunger which is being moved toward the end wall 15d is released into the inner portion of the bore 15a and/or the opening 15b, as indicated by an arrow in a broken line.

FIG. 3 illustrates a modified form of the pressurized gas supply unit in the vehicle safety device according to this invention.

The pressurized gas supply unit shown in FIG. 3 has a rupturable sealing member 19 which is welded to inner peripheral wall of the discharge spout 13a of the pressurized gas generator 13. The discharge spout 13a and the sealing member 19 are enclosed in a housing 20 which is secured to the gas generator 13. The housing 20 has a bore which is substantially aligned with the leading end of the discharge spout 13a and which is divided into separate inner and outer compartments 20a and 20b by means of an apertured partition wall 20c, as shown. The housing 20 also has an opening 20d through which the inner compartment 20a communicates with the inflatable confinement 12 (FIG. 1). A rupturing means 12 is longitudinally movably mounted in the bore of the housing 20. This rupturing means 21 is made up of a plunger portion 21a connected at its inner end to the sealing member 19 and extending outwardly into the outer compartment 20b through the apertured partition wall 20c and an enlarged outer end portion 21b merging from the plunger portion 21a and movably positioned in the outer compartment 20b. Between the partition wall 20c and the enlarged outer end portion 21b is located an explosive means 22 which is connected to the impact-responsive triggering means 10 through the lines 10a and which may be in the form of a squib similarly to its counterpart in the arrangement of FIG. 2. To facilitate the returning movement of the rupturable means 21, an aperture 20e may be formed in an end wall 20f of the housing 20 so that the outer compartment 20b is vented to the open air.

When, in operation, the explosive means 22 is activated with the triggering means 10 actuated in response to a collision of the motor vehicle, the enlarged end portion 21b of the rupturing means 21 is forcefully projected outwardly toward the end wall 20f with the result that the plunger portion 21a integral therewith forces the rupturable sealing member 19 outwardly. The sealing member 19 is thus torn apart whereby the pressurized gas stored or produced by the gas generator 13 is allowed into the inner compartment 20a through the discharge spout 13a and further into the inflatable confinement 12 (FIG. 1) through the opening 20d in the housing 20. The inflatable confinement 12 is in this manner instantaneously expanded and projected to the protective position during the collision.

It will now be appreciated from the foregoing description that the pressurized gas supply unit forming part of the vehicle safety device implementing this invention is advantageous because the pressurized gas is passed to the inflatable confinement almost instantaneously when the collision condition of the motor vehicle is responded to by the triggering means and because the pressurized gas supply unit is simple in construction and economical to manufacture. The vehicle safety device according to this invention is thus not only reliable in performance but adapted for quantity production especially for its ease of assembling.

What is claimed is:

1. A vehicle safety device for protecting a vehicle occupant or a pedestrian from injury during a collision of a motor vehicle, comprising an inflatable confinement having a collapsed stowed position and an expanded protective position, pressurized gas generating means storing a medium for producing a pressurized gas and having a pressurized gas discharge spout; a rupturable sealing member attached to a leading end of said discharge spout for closing the pressurized gas generator, a housing secured to said pressurized gas generating means for enclosing said discharge spout and said sealing member, said housing having a bore substantially aligned with said discharge spout and divided into inner and outer compartments by an apertured partition wall and having an opening communicating with said inflatable confinement, said housing having formed therein an aperture formed in the upper wall of said outer compartment, opposite said portion, said outer compartment being vented to the open air through said aperture, said inner compartment communicating with said opening; rupturing means movably accommodated in said bore, said rupturing means including a plunger portion connected at its inner end to said sealing member and extending outwardly into said outer compartment through said partition wall and an enlarged outer end portion merging from said plunger portion and movably positioned in said outer compartment; explosive means located between said partition wall and said enlarged outer end portion of said rupturable means, and impact responsive triggering means connected to said explosive means and actuated in response to an impact resulting from said collision to blast said explosive means for causing said rupturing means to be forcefully projected away from said sealing member to rupture the sealing member whereby said pressurized gas is admitted into said inflatable confinement from said pressurized gas generating means through said bore and said opening in said housing for inflating the confinement to said protective position.

* * * * *

UNITED STATES PATENT OFFICE
CERTIFICATE OF CORRECTION

Patent No. 3,744,816　　　　　　　　　Dated July 10, 1973

Inventor(s) Yamaguichi et al.

It is certified that error appears in the above-identified patent and that said Letters Patent are hereby corrected as shown below:

[30]　　　Foreign Application Priority Data

April 25, 1970　Japan..........................45/40414

The name of the second inventor "Yasuchiro" should read --Yasuhiro--.

Signed and sealed this 25th day of December 1973.

(SEAL)
Attest:

EDWARD M. FLETCHER, JR.　　　　RENE D. TEGTMEYER
Attesting Officer　　　　　　　Acting Commissioner of Patents